Patented Aug. 16, 1949

2,479,520

UNITED STATES PATENT OFFICE 2,479,520

GAS-ABSORBING MATERIAL AND PROCESS OF MAKING SAME

Marion L. Sheffer, Philadelphia, Pa., assignor to Willson Products, Inc., Reading, Pa., a corporation of Pennsylvania No Drawing. Application August 1, 1945, Serial No. 608,349

4 Claims. (Cl. 252—192)

The present invention relates to a novel gas-absorbing material and to a process of producing same.

The present invention relates to a granular absorbent, suitable for absorbing from the atmosphere such unwanted gases as hydrogen cyanide, chlorine, phosgene, carbon dioxide, sulfur dioxide, and many other acid gases, whereby the atmosphere is purified and rendered suitable for breathing. The gas purifying agent according to the present invention is in granular condition, the granules being of a highly porous character in order to afford a relatively large active surface. The granular material may be put into the canister of a gas mask, and such granular material can be kept, in seal tight cans, drums or other receptacles, for a long period of time without deterioration. In its preferred form the product of the present invention consists essentially of granular soda lime, the particles or granules of which are of a highly porous character, and the granules are more or less uniformly impregnated with cupric oxide.

The following example is given, to the details of which the invention is not limited, as an example of producing an effective and efficient gas-absorbing granular material.

A given amount, say 5 pounds of caustic soda (powder, flakes, lumps or other forms) is dissolved in 7 to 10 pounds, more or less, of water, to produce a concentrated solution of caustic soda. This solution is then cooled or allowed to cool at at least room temperature, or lower, say 15 to 20° C. Fifty pounds of hydrated lime are placed in a mixer, the above-mentioned caustic soda solution is added thereto, and 25 to 40 pounds of cuprammonium solution, substantially free from sulfate and chloride, is added thereto. The operation of the mixer is then started and a small further quantity of water can be added, and the materials then will mix together. The total amount of liquid added in this step should be enough to give a mixture having the consistency of a very stiff mortar. The said mixture is then spread out on trays and dried at a temperature around 225° F., more or less. During this drying operation a slow current of air or other inert gas (decarbonated air being very suitable) is led through the drying oven, for the purpose of carrying away the moisture and ammonia gas liberated from the mass during the driving operation. In stating that an "inert gas" is used, this means that the gas (e. g. air) does not react chemically with the soda-lime, to convert this (or any considerable portion of it) into something else.

The cuprammonium solution may be prepared by dissolving precipitated and washed cupric hydroxide, in ammonia water, or a cuprammonium solution can of course also be prepared by aerating for a substantial period, a mixture of metallic copper and ammonia water. The degree of concentration of the cuprammonium solution is subject to variation, and as an example, a solution containing 3.5 to 4.5 percent of CuO and 3.5 to 4.5 percent of total $NH_3$ is mentioned as satisfactory. For giving best results, the cuprammonium solution should be free or substantially free of sulfates, chlorides and other metallic salts. It will be seen that the above stated amounts and concentrations of cuprammonium solution will be such as to leave about 0.87 lb. to about 1.8 lbs. (about 1.5% to about 3.2%) of CuO in the soda lime, which CuO will be uniformly distributed throughout such material. During the heating step, about 0.87 lb. to about 1.8 lbs. of ammonia gas, $NH_3$, will be liberated from the decomposition of the cuprammonia.

The amount of caustic soda, in this example given, will be 9% but as usual, the amount of caustic soda in soda-lime can be substantially varied.

During the drying of the material in the oven as above described, ammonia gas and steam are liberated from the mortar-like mass, and the liberation of said steam and ammonia are found to produce a high degree of porosity in the material undergoing drying.

After the drying operation, the material is reduced to a granular state, for example, by crushing and sifting. The size of the granules is variable, depending upon the size of the canister or other receptacle in which the granular material is to be used. For illustration, granules passing a No. 8 standard screen and retained on a No. 14 standard screen, or retained on a No. 20 standard screen, have proven to be satisfactory.

In my opinion the copper oxide content of the granular product functions as a catalyst, to make the granular material more efficient for acting as an absorbent for the types of unwanted gases mentioned above.

Without restriction of the invention thereto, it may be stated that a suitable CuO content, in the granular absorbent material is about 0.5 percent to about 5.0 percent, and samples within these percentages have given desired results. The amount of copper oxide will be seen to be small, as compared with the other components.

The granules produced as above described are sufficiently strong to maintain their granular condition in being poured into a canister, and to withstand the usual jarring in the canister, for a long period.

In the drying operation a gentle current of air or other inert gas is preferably passed through the oven. Products of combustion of carbonaceous fuel should not be used for the purpose, since such gases would quickly carbonate the lime and caustic soda, which of course is to be avoided. If ordinary dry air is used, a slight amount of carbonation of the soda-lime would occur, but this detracts only slightly from the capacity of the product to act as an absorbent for acid gases and vapors. In the drying step, most of the calcium remains in the form of hydroxide (hydrated lime). The product after the drying may contain from about a trace to five percent of loosely held water which would be driven off by heating to a strong red heat.

After the product is thus dried as above described, and after it is granulated and sifted to size, free water may be added to a total of approximately 15% to 25%, and then the granules are sealed until used. This addition of free water enables control of its amount in accordance with the needs for best results with the particular gas with which it is to be used. And this controlled amount of free water is in addition to any combined water in the constituent chemicals. The material as processed in the manner above described, and before the addition of said amount of free water, has a bulk specific gravity of approximately 0.86.

One of the important properties of the product is the porosity of the granules, due to the increase in such porosity, the absorbing capacity for acid gases and the rapidity with which the granules absorb such acid gases is not only materially increased, but the effective useful life of the material is doubled and tripled over that of material heretofore used.

What is claimed is:

1. A process of making an absorbent material having a porous character, which comprises mixing together lime, caustic soda solution, and cuprammonium solution, the two latter being substantially free from sulphates and chlorides, in such proportions as to produce a mixture having the consistency of a very stiff mortar, the concentration and amount of cuprammonium solution being sufficient to leave about 1.5 to 3.2% CuO in the product, and the amount of caustic soda being such as to form soda-lime, with the quantity of lime used, and heating the said mortar-like mass sufficiently to dry the same and to decompose the cuprammonium solution with formation of free ammonia and cupric oxide, and to remove substantially all free water, leaving the lime substantially as calcium hydroxide, and reducing the mass to a substantially granular condition.

2. Process as in claim 1, in which the said heating step is conducted in an oven at about 225° F., and in the substantial absence of gaseous products of combustion of carbonaceous fuels.

3. Process as in claim 1 in which the said heating step is conducted in an oven at about 225° F., in the substantial absence of gaseous products of combustion of carbonaceous fuel, and while passing a current of a gas which is substantially inert to soda-lime through said oven and in contact with said material undergoing drying.

4. As a new product, granular soda-lime of a high degree of porosity substantially all of the granules of which are impregnated with about 1.5% to about 3.2% of cupric oxide throughout the bodies of said granules.

MARION L. SHEFFER.

REFERENCES CITED

The following references are of record in the file of this patent:

UNITED STATES PATENTS

| Number | Name | Date |
|---|---|---|
| 1,333,524 | Wilson | Mar. 9, 1920 |
| 1,597,345 | Dely | Aug. 24, 1926 |
| 1,716,479 | Bilsky | June 11, 1929 |
| 1,823,335 | Richert | Sept. 15, 1931 |
| 1,895,724 | Miller et al. | Jan. 31, 1933 |
| 1,943,821 | Hanks et al. | Jan. 16, 1934 |
| 2,196,593 | Muskat | Apr. 9, 1940 |